United States Patent
Miyamoto et al.

(10) Patent No.: US 6,423,127 B1
(45) Date of Patent: Jul. 23, 2002

(54) PSEUDO-PLASTIC WATER BASE INK FOR BALL POINT PEN

(75) Inventors: Masaru Miyamoto; Shigeru Miyazaki; Yoji Takeuchi, all of Yokohama (JP)

(73) Assignee: Mitsubishi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/463,836

(22) PCT Filed: Jul. 30, 1998

(86) PCT No.: PCT/JP98/03386
§ 371 (c)(1),
(2), (4) Date: Jan. 28, 2000

(87) PCT Pub. No.: WO99/06494
PCT Pub. Date: Feb. 11, 1999

(30) Foreign Application Priority Data

Jul. 30, 1997 (JP) ............................................... 9-204962
Jul. 27, 1998 (JP) ........................................... 10-210724

(51) Int. Cl.[7] .......................... C09D 11/00; C09D 11/16
(52) U.S. Cl. ................................ 106/31.58; 106/31.86; 106/31.67; 106/31.35
(58) Field of Search .................... 106/31.58, 31.86, 106/31.67, 31.35

(56) References Cited

FOREIGN PATENT DOCUMENTS

| EP | 0 787 779 A2 | 4/1998 | ........... C09D/11/18 |
|---|---|---|---|
| JP | 62253678 | 11/1987 | |
| JP | Hei 2-38474 | 2/1990 | |
| JP | 05058096 | 3/1993 | |
| JP | 06145577 | 5/1994 | |
| JP | Hei 9-302299 | 11/1997 | |
| JP | Hei 10-219176 | 8/1998 | |

*Primary Examiner*—Helene Klemanski
*Assistant Examiner*—Veronica F. Faison
(74) *Attorney, Agent, or Firm*—Darby & Darby

(57) ABSTRACT

A pseudo-plastic water based ink for a ball point pen which causes less scattering in a viscosity depending on a production lot and has good stability with the passage of time whatever coloring materials are used and which provides a good writing feeling and is excellent in cap-off resistance. The ink described above comprises at least a colorant, water and a polyglycerin isostearic acid ester represented by the following Formula (1):

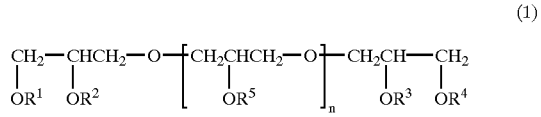

(1)

wherein n represents an integer of 1 to 8; $R^1$ to $R^4$ each independently and $R^5$'s, which may be the same or different, represent an isostearoyl group or a hydrogen atom; and the number of the isostearoyl group is 1 to 4.

2 Claims, No Drawings

PSEUDO-PLASTIC WATER BASE INK FOR BALL POINT PEN

TECHNICAL FIELD

The present invention relates to a water based ink for a ball point pen, more specifically to an ink for a shear thinning water based ink-filled ball point pen having advantages of a ball point pen using an oil based ink, that is, a pseudo-plastic water based ink for a ball point pen.

BACKGROUND ART

In general, inks for a ball point pen have so far been classified into a low-viscosity, water based ink for a ball point pen which contains a solvent comprising a water based solvent such as water and has an ink viscosity of 10 mPa·s or less and an oil based ink which contains a solvent comprising an oil based solvent such as a mineral oil, a polyhydric alcohol, a fatty acid and cellosolve and has an ink viscosity of 1000 to 20000 mPa·s.

A ball point pen using an oil based ink for a ball point pen has such structure that the ink adhered on a ball through an ink reservoir having a small diameter is transferred onto a paper surface by rotation of the ball and only the transferred portion of the ink is fed again from the reservoir to the ball.

A ball point pen using a water based ink for a ball point pen has such structure that the ink is fed to a ball surface and a paper surface by virtue of capillary action of a feed prepared by binding fine fibers.

While the water based ink for a ball point pen and the oil based ink for a ball point pen described above each have excellent advantages, they have various problems as well. For example, in the water based ink for a ball point pen, capillary action is used in a principle of feeding the ink because of a low viscosity thereof, wherein a simple contact of the tip portion of the ball point pen with paper allows the capillary action to be exerted on the contact point thereof to feed the ink, and fine lines can be written on a paper surface without applying so much writing pressure, so that splitting, starving and blobbing scarcely take place. On the other hand, loading the ink directly into the ink reservoir allows the ink to leak due to vibration, impact and a temperature rise in the open air to make the amount of the ink to be fed to the ball unstable, so that the ball point pen requires complicated structure having a feed prepared by binding fine fibers and has the problem that it is difficult to observe the amount of the ink.

On the other hand, an oil based ink for a ball point pen is characterized by that because of a high viscosity thereof, blobbing of the ink from the pen tip can be prevented and the ink can be stored directly in the ink reservoir having a small diameter, so that the structure of the ball point pen can be simplified and that the amount of the ink can be observed by using a transparent material for the ink reservoir. However, there are involved the problems that since the ink is transferred only on a paper surface contacted with the rotating ball, splitting and starving are liable to be caused if the ball rotates unstably and that since the ink hardly penetrates into a paper surface, blobbing, which causes stain with the untransferred ink, is apt to be caused.

In recent years, in order to solve such problems, found in several cases are water based inks for a ball point pen in which a gelatinizer and a water soluble paste are added to impart a specific viscosity characteristic to the ink (hereinafter referred to as a pseudo-plastic water based ink for a ball point pen).

A ball point pen using this pseudo-plastic water based ink for a ball point pen is reduced in an ink viscosity by shear force which is applied to the ink by rotation of the ball at the tip point when writing and can write as smoothly as a ball point pen using a water based ink and draw fine lines on a paper surface. Further, blobbing of the ink from the pen point can be prevented because the ink has a high viscosity when the pen is not used for writing. In addition, the ink can be stored directly into the ink reservoir, so that the structure of the pen can be simplified, and the use of a transparent material for the ink reservoir makes it possible to observe the amount of the ink. Thus, the use of the pseudo-plastic water based ink for a ball point pen enable to provide a writing instrument having both characteristics of a ball point pen using a water based ink and a ball point pen using an oil based ink.

When producing this pseudo-plastic water base ink for ball point pen, a viscosity-controlling agent has so far had to be blended as an essential component for ink materials. The viscosity-controlling agent is added in order to impart pseudo-plasticity to the ink, and it is proposed to add, for example, polyacrylic acid salts, cross-linking type acrylic acid polymers, salts of a styrene-acrylic acid copolymer, salts of a styrene-maleic acid copolymer, nonionic polymers such as polyvinylpyrrolidone and polyethylene glycol, and polysaccharides such as xanthan gum, guar gum, casein, gum arabic, gelatin, carrageenan, alginic acid, tragacanth gum and locust bean gum.

However, these viscosity-controlling agents (thickeners) have caused the problems that they have scattering in the capability of providing a shear thinning property depending on a lot to exert an influence on the writing property and they are inferior in affinity with some coloring materials to cause a change in the viscosity with heating and aging and deteriorate the performances of the ball point pen and that since various materials such as a surfactant, an organic solvent, a dispersant resin for a pigment in addition to these viscosity-controlling agents are compounded depending on the kinds of inks, they cannot be blended optionally.

Thus, the present invention has been made in order to solve the problems described above, and an object thereof is to provide a pseudo-plastic water based ink for a ball point pen which causes less scattering in a viscosity depending on a production lot and has good stability with the passage of time whatever coloring materials are used and which provides a good writing feeling and is excellent in cap-off resistance.

DISCLOSURE OF THE INVENTION

Intensive researches continued by the present inventors in order to achieve the object described above have resulted in solving the conventional problems described above and coming to complete the present invention.

That is, a pseudo-plastic water based ink for a ball point pen according to the present invention comprises at least a colorant, water and a polyglycerin isostearic acid ester represented by the following Formula (1):

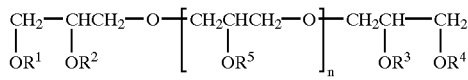

(1)

wherein n represents an integer of 1 to 8; $R^1$ to $R^4$ each independently and $R^5$'s, which may be the same or different, represent an isostearoyl group or a hydrogen atom; and the number of the isostearoyl group is 1 to 4.

Further, the ink described above has a viscosity of 100 to 4000 mPa·s at a shearing speed of 3.84 s$^{-1}$.

BEST MODE FOR CARRYING OUT THE INVENTION

Next, the respective components used in the pseudo-plastic water based ink for a ball point pen according to the present invention shall be explained.

In the present invention, the polyglycerin isostearic acid ester added to the pseudo-plastic water based ink for a ball point pen is represented by the Formula (1) described above. In the formula, n is an integer of 1 to 8, preferably 3 to 6 and $R^1$ to $R^4$ each represent independently an isostearoyl group or a hydrogen atom, and $R^5$'s, which may be the same or different, represent an isostearoyl group or a hydrogen atom. Further, the number of the isostearoyl group is 1 to 4, preferably 1 to 2.

The polyglycerin isostearic acid ester used in the present invention is excellent in lubricity, provides a shear thinning property and has a vaporization-inhibiting effect, so that it can be used as a substitutive material for each of polar solvents, lubricants and viscosity-controlling agents out of conventional ink materials. In particular, when it is used as a substitutive material for a viscosity-controlling agent, it does not exert an influence which originates in its having scattering in capability of providing a shear thinning property depending a lot on the writing property and it does not cause a change in the viscosity with heating and aging due to its inferior affinity with some coloring materials and hence does not deteriorate the performances of the ball point pen. The addition amount thereof is 1 to 30% by weight, preferably 3 to 20% by weight and more preferably 5 to 15% by weight based on the total amount of the ink.

The polyglycerin isostearic acid ester can be used, if necessary, in combination with other polar solvents, lubricants and viscosity-controlling agents respectively.

As described above, all dyes and pigments which can be dissolved or dispersed in water based solvents can be used as the colorant. To give specific examples thereof, there can be used, acid dyes such as Eosine, Phloxine, Water Yellow #6-C, acid red, Water Blue #105, Brilliant Blue FCF and Nigrosine NB, direct dyes such as Direct Black 154, Direct Sky Blue 5B and Violet BB, basic dyes such as Rhodamine and Methyl Violet, inorganic pigments such titanium dioxide, carbon black and ultramarine, organic pigments such as Copper Phthalocyanine Blue and Benzidine Yellow, and various metal powders. They can be used alone or in a mixture of two or more kinds thereof. The using amount thereof is preferably 3 to 20% by weight based on the total amount of the ink.

When a pigment is used as the colorant, a water-soluble polymer dispersant and a surfactant have to be suitably selected and blended. The water-soluble polymer includes anionic polymers such as polyacrylic acid salts, salts of a styrene-acrylic acid copolymer, salts of a styrene-maleic acid copolymer, salts of a vinylnaphthalene-maleic acid copolymer and a β-naphthalenesulfonic acid-formalin condensation product, and nonionic polymers such as polyvinyl alcohol, polyvinylpyrrolidone and polyethylene glycol.

Water can be used as the principal solvent, and polar solvents can be used in combination with the polyglycerin isostearic acid ester. All solvents having polar groups which are miscible with water can be used as the polar solvent. There can be used, for example, ethylene glycol, diethylene glycol, triethylene glycol, polyethylene glycol, propylene glycol, ethylene glycol monomethyl ether, glycerin, pyrrolidone and triethanolamine.

Controlling agents which can be used, if necessary, in addition to the components described above include a lubricant such as polyalkylene glycol derivatives, fatty acid alkali salts, nonionic surfactants and fluorine base surfactants, a rust preventive such as benzotriazole and saponins, a pH-controlling agent such as potassium hydroxide and potassium phosphate, a preservative such as sodium omadine and 1,2-benzoisothiazoline, and a viscosity-controlling agent such as polyacrylic acid salts and alginic acid.

Further, the ink which is prepared by the above components has a viscosity falling in a range of 100 to 4000 mPa·s, preferably 200 to 2000 mPa·s and more preferably 300 to 1000 mPa·s at a shearing speed of 3.84 s$^{-1}$. If the viscosity of the ink is lower than 100 mPa·s, the ink is blobbed from the pen tip. Further, when a colorant having a large specific gravity such as titanium dioxide and metal powder is used, the viscosity has to be controlled rather high in order to prevent the colorant from settling, and the upper limit thereof is preferably 4000 mPa·s. If the upper limit exceeds 4000 mPa·s, there are misgivings of bringing about a reduction in the writing property due to inferior follow-up of the ink.

A pseudo-plastic (shear thinning) water based ink for a ball point pen according to the present invention can easily be obtained by dissolving the components described above, if necessary, with heating and mixing under stirring.

Examples

The present invention shall be explained below in further details with reference to examples and comparative examples, but the present invention shall by no means be restricted by the examples.

Example 1

A blue, pseudo-plastic water based pigment ink for a ball point pen was prepared according to the following recipe:

| | |
|---|---|
| Phthalocyanine Blue | 8.0% by weight |
| Styrene-maleic acid resin ammonium salt | 3.0% by weight |
| Hexaglycerin isostearic acid 1.5 ester | 15.0% by weight |
| Propylene glycol | 5.0% by weight |
| Potash soap (lubricant) | 0.4% by weight |
| 1,2-Benzoisothiazolone salt (preservative) | 0.3% by weight |
| Aminomethylpropanol (pH-controlling agent) | 0.3% by weight |
| Benzotriazole (rust preventive) | 0.2% by weight |
| Ion-exchanged water | balance |

Example 2

A black, pseudo-plastic water based pigment ink for a ball point pen was prepared according to the following recipe:

| | |
|---|---|
| Carbon black | 7.0% by weight |
| Styrene-acrylic acid resin ammonium salt | 3.0% by weight |
| Hexaglycerin isostearic acid 1.5 ester | 5.0% by weight |
| Ethylene glycol | 15.0% by weight |
| Potash soap (lubricant) | 0.4% by weight |
| 1,2-Benzoisothiazolone salt (preservative) | 0.3% by weight |
| Aminomethylpropanol (pH-controlling agent) | 0.3% by weight |
| Benzotriazole (rust preventive) | 0.2% by weight |
| Polyacrylic acid salt (acryl base synthetic polymer: viscosity-controlling agent) | 0.1% by weight |
| Ion-exchanged water | balance |

Example 3

A blue, pseudo-plastic water based pigment ink for a ball point pen was prepared according to the following recipe:

| | |
|---|---|
| Phthalocyanine Blue | 8.0% by weight |
| Styrene-acrylic acid resin ammonium salt | 2.7% by weight |
| Octaglycerin isostearic acid diester | 12.0% by weight |
| Propylene glycol | 5.0% by weight |
| Phosphoric acid ester (lubricant) | 0.5% by weight |
| 1,2-Benzoisothiazolone salt (preservative) | 0.3% by weight |
| Aminomethylpropanol (pH controlling agent) | 0.3% by weight |
| Benzotriazole (rust preventive) | 0.2% by weight |
| Polyacrylic acid salt (acryl base synthetic polymer: viscosity-controlling agent) | 0.1% by weight |
| Ion-exchanged water | balance |

Comparative Example 1

In the ink prepared in Example 1, the hexaglycerin isostearic acid 1.5 ester was excluded, and further 15% by weight of propylene glycol and 0.4% by weight of a cross-linking type acrylic acid polymer were added respectively to obtain a blue, pseudo-plastic water based ink for a ball point pen.

Comparative Example 2

In the ink prepared in Example 2, the hexaglycerin isostearic acid 1.5 ester was excluded, and further 0.3% by weight of a polyacrylic acid salt was added to obtain a black, pseudo-plastic water based ink for a ball point pen.

Comparative Example 3

In the ink prepared in Example 3, the octaglycerin isostearic acid diester was excluded, and further 10% by weight of propylene glycol and 0.25% by weight of the polyacrylic acid salt were added respectively to obtain a blue, pseudo-plastic water based ink for a ball point pen.

Comparative Example 4

In the ink prepared in Example 3, the octaglycerin isostearic acid diester was excluded, and further 10% by weight of propylene glycol was added to obtain a blue, pseudo-plastic water based ink for a ball point pen.

Comparative Example 5

In the ink prepared in Example 3, the octaglycerin isostearic acid diester was excluded, and further 20% by weight of propylene glycol and 0.80% by weight of the polyacrylic acid salt were added respectively to obtain a blue, pseudo-plastic water based ink for a ball point pen.

The inks obtained according to the foregoing recipes of Examples 1 to 3 and the inks obtained according to the recipes of Comparative Examples 1 to 5 were charged respectively into ball point pens having a ball of a diameter of 0.7 mm. Determined were the initial viscosity at a shearing speed of 3.84 s$^{-1}$, a change in the viscosity after stored at 50° C. for one month, the time passed until starving was caused on leaving standing with the caps unfastened, and the writing feeling of the ball point pens. The results thereof are shown in Table 1.

TABLE 1

| | Example | | | Comparative Example | | | | |
|---|---|---|---|---|---|---|---|---|
| | 1 | 2 | 3 | 1 | 2 | 3 | 4 | 5 |
| Ink viscosity (mPa · s) | 500 | 500 | 400 | 700 | 600 | 500 | 50 | 4500 |
| Viscosity change | None | None | None | A little rise | Rise | Reduced | None | Rise |
| Time until starving | 28 | 21 | 21 | 28 days | 14 | 14 | 60 | One |

TABLE 1-continued

| | Example | | | Comparative Example | | | | |
|---|---|---|---|---|---|---|---|---|
| | 1 | 2 | 3 | 1 | 2 | 3 | 4 | 5 |
| Writing feeling | ○ days | ○ days | ○ days | Δ | Δ days | ○ days | ○ days | X day |
| Ink followability | ○ | ○ | ○ | ○ | ○ | ○ | ○ | X |
| Ink blobbing | None | None | None | None | None | None | Present | None |

Evaluation of writing feeling:
○: smooth and stable writing feeling
Δ: stiff writing feeling
X: stiff writing feeling and having splitting and directionality Evaluation of ink followability:
○: capable of writing smoothly and stably even at a double speed
Δ: causing skipping in writing at a double speed
X: no follow-up of ink and causing skipping in usual writing As described above, according to the present invention, a pseudo-plastic water based ink for a ball point pen which is very excellent in stability with the passage of time and has a vaporization-inhibiting effect and which has a good writing feeling can be obtained.

Industrial Applicability

As described above, the ink of the present invention can be used as a pseudo-plastic water based ink for a ball point pen which is very excellent in stability with the passage of time and has a vaporization-inhibiting effect and which has a good writing feeling.

What is claimed is:
1. A pseudo-plastic water based ink for a ball point pen comprising at least a colorant, water and a polyglycerin isostearic acid ester represented by the following Formula (1) and containing said polyglycerin isostearic acid ester of 5 to 15% by weight based on the total amount of the ink:

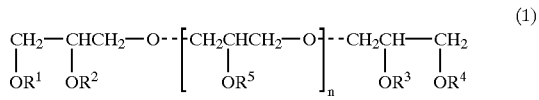

wherein n represents an integer of 1 to 8; $R^1$ to $R^4$ each independently and $R^5$, which may be the same or different, represent an isostearoyl group or a hydrogen atom; and the number of the isostearoyl group is 1 to 4.

2. The pseudo-plastic water based ink for a ball point pen as described in claim 1, wherein said ink has a viscosity of 100 to 4000 mPa·s at a shearing speed of 3.84 $s^{-1}$.

* * * * *

UNITED STATES PATENT AND TRADEMARK OFFICE
CERTIFICATE OF CORRECTION

PATENT NO. : 6,423,127 B1
DATED : July 23, 2002
INVENTOR(S) : Masaru Miyamoto et al.

It is certified that error appears in the above-identified patent and that said Letters Patent is hereby corrected as shown below:

Title page,
Item [73], Assignee, delete "Mitsubishi Kabushiki Kaisha" and substitute
-- Mitsubishi Pencil Kabushiki Kaisha --

Signed and Sealed this

Fifteenth Day of July, 2003

JAMES E. ROGAN
*Director of the United States Patent and Trademark Office*